(12) United States Patent
Tolt et al.

(10) Patent No.: US 6,630,023 B2
(45) Date of Patent: *Oct. 7, 2003

(54) SURFACE TREATMENT PROCESS USED IN GROWING A CARBON FILM

(75) Inventors: Zhidan Li Tolt, Austin, TX (US); Zvi Yaniv, Austin, TX (US); Richard Lee Fink, Austin, TX (US)

(73) Assignee: SI Diamond Technology, Inc., Austin, TX (US)

(*) Notice: Subject to any disclaimer, the term of this patent is extended or adjusted under 35 U.S.C. 154(b) by 205 days.

This patent is subject to a terminal disclaimer.

(21) Appl. No.: 09/754,558

(22) Filed: Jan. 4, 2001

(65) Prior Publication Data

US 2001/0001679 A1 May 24, 2001

Related U.S. Application Data (60) Division of application No. 09/396,343, filed on Sep. 15, 1999, now Pat. No. 6,310,432, which is a continuation-in-part of application No. 08/859,960, filed on May 21, 1997.

(51) Int. Cl.$^7$ ................................................ C30B 25/04
(52) U.S. Cl. ......................... 117/90; 117/94; 117/95; 117/97; 117/929
(58) Field of Search .................................. 117/90, 95, 97, 117/94, 929

(56) References Cited

U.S. PATENT DOCUMENTS

| | | | | |
|---|---|---|---|---|
| 5,576,051 A | * | 11/1996 | Takeda et al. | 427/77 |
| 5,628,659 A | * | 5/1997 | Xie et al. | 445/3 |
| 5,696,385 A | * | 12/1997 | Song et al. | 257/10 |
| 5,698,328 A | * | 12/1997 | Bunshah et al. | 428/408 |
| 5,759,080 A | * | 6/1998 | Yoshioka et al. | 445/51 |

* cited by examiner

*Primary Examiner*—Robert Kunemund
(74) *Attorney, Agent, or Firm*—Kelly K. Kordzik; Winstead Sechrest & Minick P.C.

(57) ABSTRACT

A film (carbon and/or diamond) for a field emitter device, which may be utilized within a computer display, is produced by a process utilizing treatment of a substrate and then depositing the film. The treatment step creates nucleation and growth sites on the substrate for the film deposition process and promotes election emission of the deposited film. With this process, a patterned emission can be achieved without post-deposition processing of the film. A field emitter device can be manufactured with such a film.

1 Claim, 11 Drawing Sheets

SURFACE TREATMENT PROCESS USED IN GROWING A CARBON FILM

This is a division of application Ser. No. 09/396,343 filed Sep. 15, 1999 now U.S. Pat. No. 6,310,432, which is a continuation-in-part of application Ser. No. 08/859,960 filed May 21, 1997 pending.

TECHNICAL FIELD

The present invention relates in general to growing carbon films, and in particular, to growing a carbon film on a treated substrate.

BACKGROUND INFORMATION

Field emission display devices show promise in providing a low cost alternative to LCD displays, especially with respect to laptop computers. Furthermore, field emission devices are beginning to be practically applied in other areas, such as billboard-type display devices.

One of the challenges in producing a good field emission device or display is the manufacture of a field emitter material, which is inexpensive to manufacture yet efficient with respect to power consumption and consistent in its display characteristics. Carbon and/or diamond field emitter materials have shown promise in meeting such constraints.

One of the problems with the present method for fabricating a matrix addressable display using such a film is that in order to pattern the film, one or more lithography and etching steps have to be applied to the film after it has been deposited. Such processes degrade the film's performance and emission capabilities, often to the point where the film emissions are inadequate. As a result, there is a need in the art for a fabrication process whereby post-deposition processes performed on the film are not utilized.

Furthermore, to make field emission displays economically feasible, there is a need to enhance the field emission properties of the deposited film. Therefore, there is a need in the art for improvements in the emission properties of carbon and diamond-like films.

SUMMARY OF THE INVENTION

The foregoing need is addressed by the present invention. A substrate, such as a ceramic or glass, is cleaned and metalized by electron-beam (e-beam) evaporation or sputtering of metals, such as titanium (Ti). A desired metal feedline pattern is then made by conventional photolithography and etching of the metal. This pattern can also be made by metalization through a shadow mask. Emitting areas, or pixels, are then defined by another lithography process. The metal layer in these areas are removed again by etching. Utilizing the same photoresist as a mask, a surface treatment process such as an acid or base etch is then applied, in which the surface morphology and possibly chemical composition (if non-elemental materials are used) of the substrate in the pixel areas are changed. Another thin layer of metal is then further deposited. The photoresist is stripped, leaving only the pixel area treated and the thin metal layer coated. Lastly, a thin layer of emitting carbon film is deposited all over the surface. Since the pixel areas have been treated such that the surface morphology on these areas not only greatly enhances the nucleation, but also the growth of the carbon film, electron emission is promoted from the carbon film at these pixel areas. As a result, even though the carbon film was not patterned, only the pixel areas emit when an electrical field is applied to the film.

An alternative is that no thin metal layer is deposited on the active area; the emitting carbon film is deposited directly onto the treated substrate. This alternative is applicable when each pixel area is small (less than a few hundreds of micrometers square, as an example).

Another alternative is that a surface treatment is applied with or without lithography to the substrate before it is metalized. A metal layer is then deposited onto the substrate with or without any patterning. Carbon film is then deposited. In the instance of no patterning for both active area and metalization, the entire substrate surface will emit electrons effectively, which is useful for such applications as lighting or cold electron sources.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIGS. 1–9(b) illustrate a deposition process in accordance with the present invention;

DETAILED DESCRIPTION

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring to FIGS. 1–10, there is illustrated a process for producing a film for a field emission device in accordance with the present invention. In step 1001, a substrate 101, which may be comprised of glass, ceramic, or any other suitable material, is cleaned and then coated (metalized) with a metal 102 such as titanium (Ti), by electron-beam (e-beam) evaporation or sputtering (see FIG. 1). Note, however, that any process for depositing a metal layer 102 on a substrate 101 may be utilized.

Thereafter, in step 1002, the metal layer 102 is patterned in a desired manner using photolithography. A photoresist layer 201 is deposited on the metal layer 102 (see FIG. 2) and then patterned using well-known techniques. (See FIGS. 2, 3A and 3B.) The pattern may be an array of strips developed in the photoresist film. However, please note that any pattern design may be employed.

Figure 10:
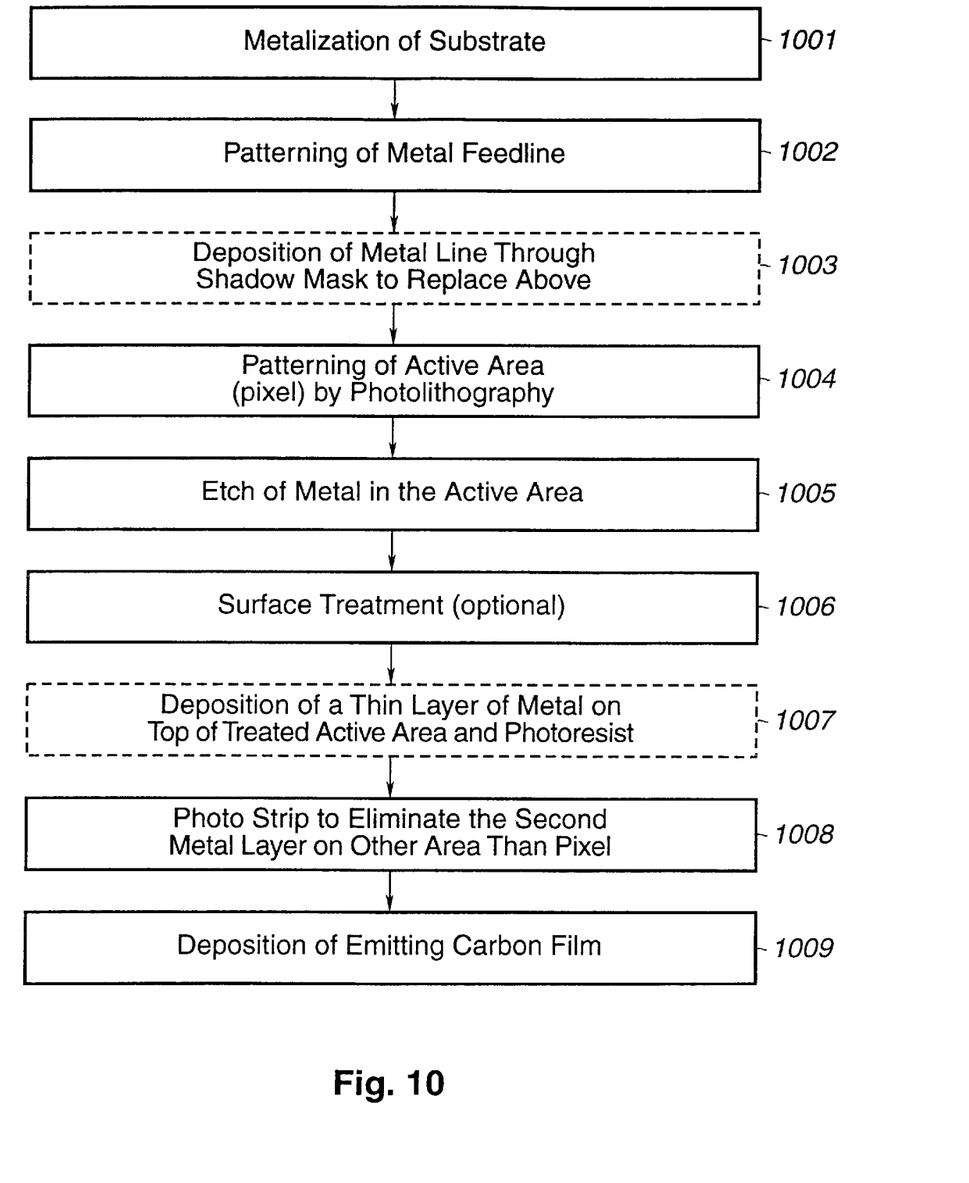
FIG. 10 illustrates a flow diagram in accordance with the present invention.

This pattern can optionally be made by metalization (deposition of a metal line) through a shadow mask (step 1003).

Figure 1:
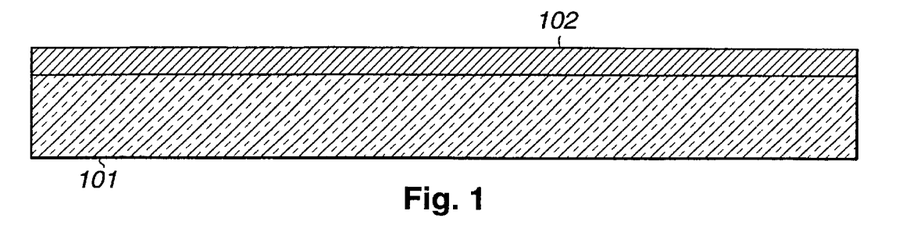
Figure 2:
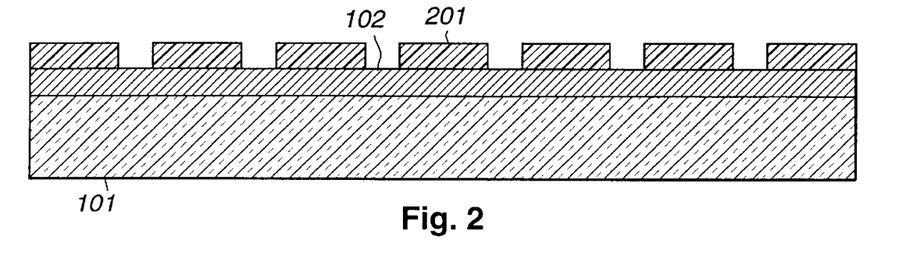
Figure 3A:
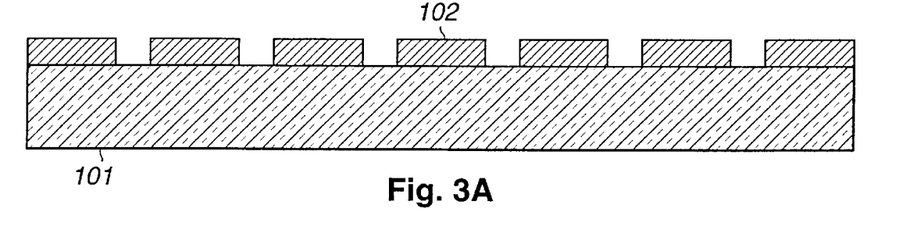
Figure 3B:
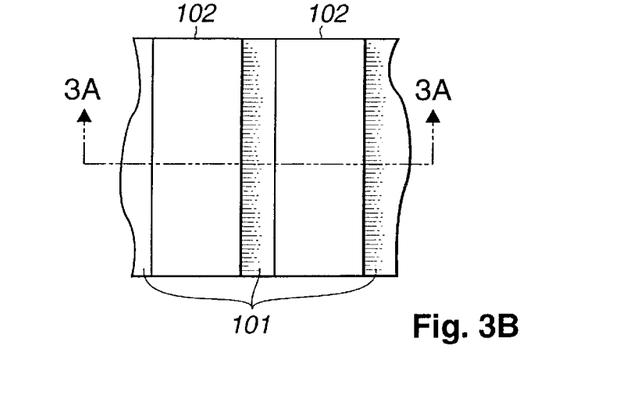
Figure 4:
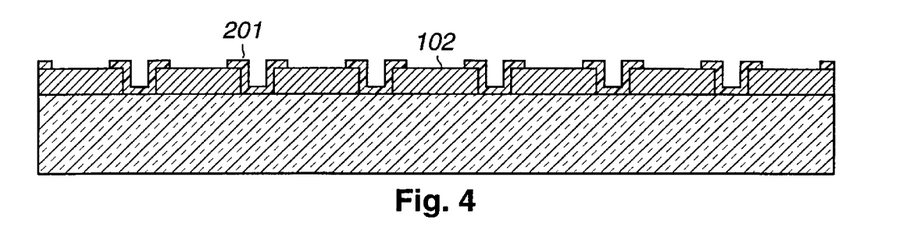
Figure 5A:
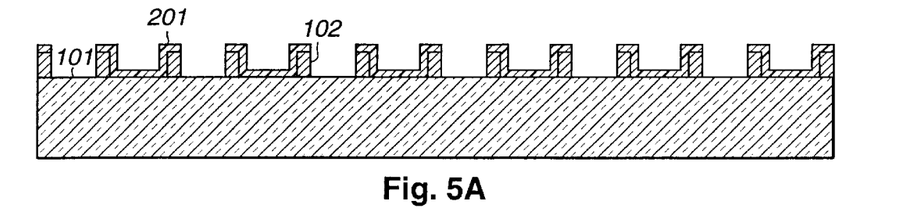
Figure 5B:
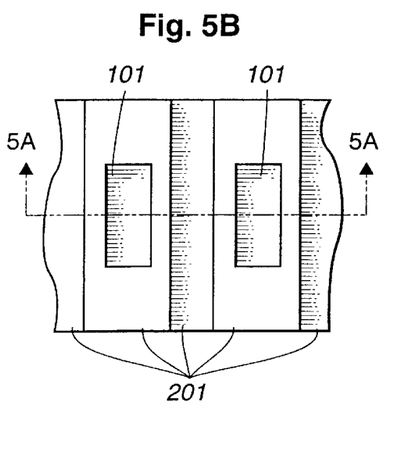

Emitting areas, or pixels, are then defined by another lithography process. In FIG. 4, photoresist 201 is developed into a pattern (step 1004). The metal layer that is not covered by the photoresist windows is then removed by an etching step as shown in FIGS. 5A and 5B (step 1005).

Figure 6A:
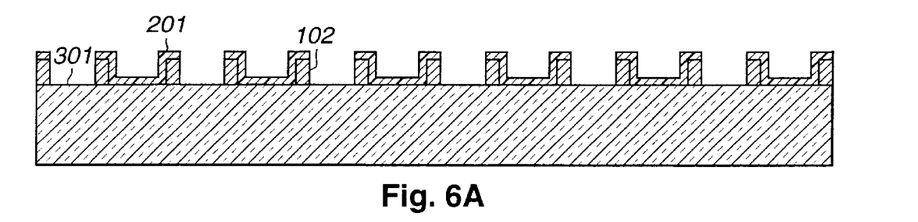
Figure 6B:
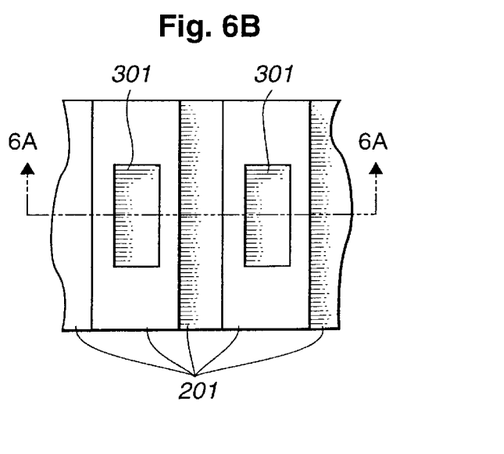

Thereafter, in step 1006, utilizing the same photoresist 201 as a mask, a surface treatment process, such as an acid or base etch, is then applied, in which the surface morphology and possibly the chemical composition (if non-elemental materials are used) of the substrate 101 in the pixel areas are changed. This results in a treated substrate surface 301, as illustrated in FIGS. 6A and 6B.

After treatment, the surface is roughened. As noted above, surface treatments by acids and bases may also change the chemical composition of the substrate surface as well as change the morphology. For example, certain treatments may leave the surface of a substrate terminated with bonds to hydrogen or fluorine atoms. If the substrate is a composition of different materials, the treatment may result in leaving the surface with a different composition than the bulk material of the substrate. Because, the CVD growth process often involves chemical reactions with the substrate surface, treatments that change the chemical composition of the substrate surface results in a surface that initiates emitter film growth more favorably than an untreated surface.

Figure 7:
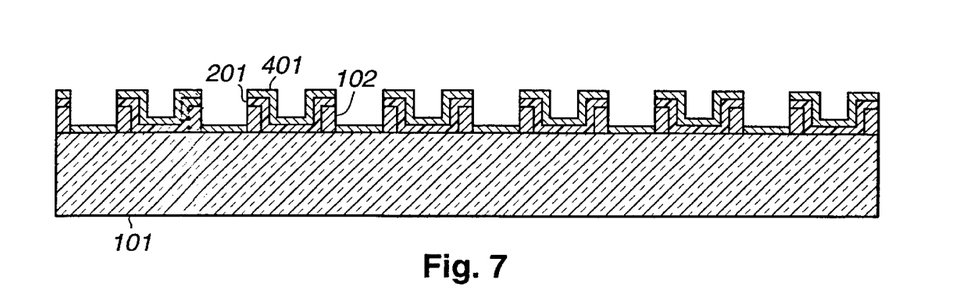
Figure 8A:
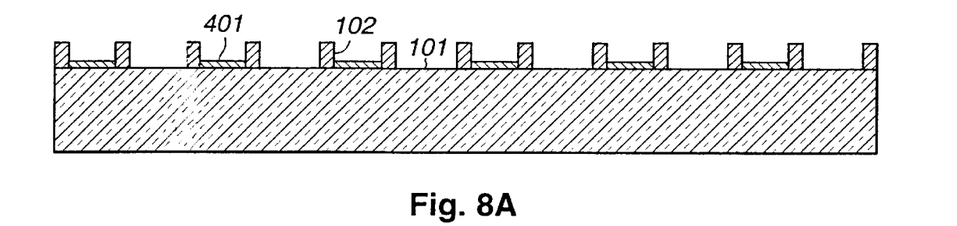
Figure 8B:
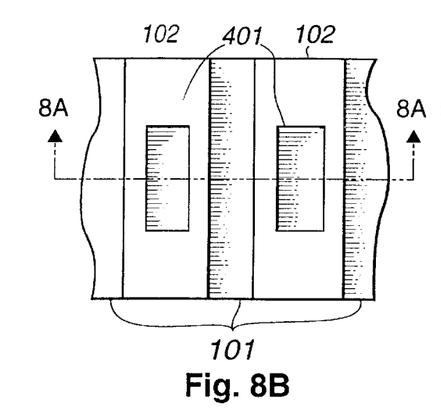
Figure 9A:
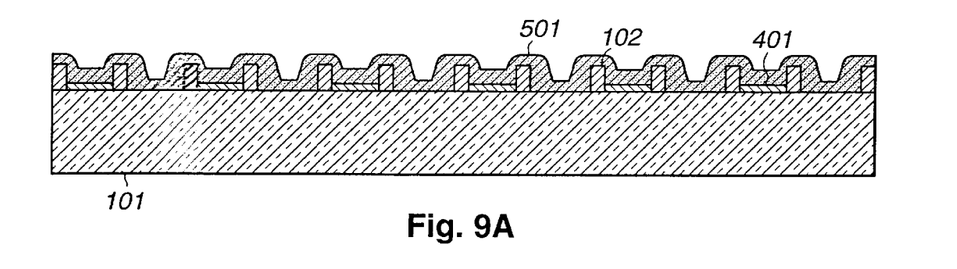
Figure 9B:
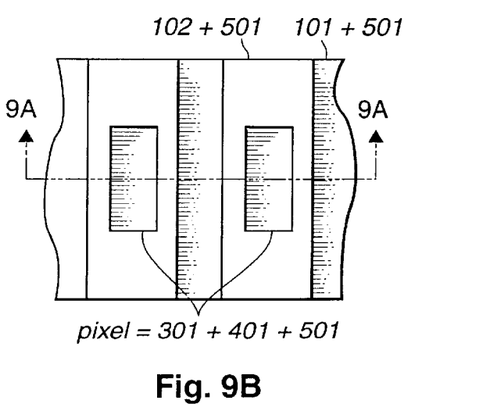

Thereafter, in step 1007, an optional step is performed of depositing a thin layer of metal 401 on top of the treated active area 301 and the photoresist 201, as illustrated in FIG. 7. In step 1008, the photoresist 201 and the metal layer 401 thereon are stripped, leaving only the treated pixel area with the coating of thin metal 401 thereon, as illustrated in FIGS. 8A and 8B. In step 1009, a thin layer of emitting carbon film 501 is deposited all over the surfaces of thin metal layer 401, metal lines 102 and substrate 101, as illustrated in FIGS. 9A and 9B. Since the pixel areas have been treated such that the surface morphology or chemical composition on these areas greatly enhances the nucleation and growth of the carbon film, and strongly promotes electron emission from the carbon film. Only the pixel areas 301 emit when an electrical field is applied to the film 501 even though the carbon film was not patterned.

The deposition process of step 1009 may be performed using a chemical vapor deposition process, which may be assisted by other activation means, such as a hot-filament process.

As can be noted, an advantage of this process is that microelectronics type processing, such as lithography or etching steps, need not be performed subsequent to deposition of a carbon layer, so that the carbon layer is not subject to such processes. This results in a better emitting film and damage to the emitting film is prevented.

An alternative embodiment does not perform step 1007. Instead, the emitting carbon film 501 is deposited directly onto the treated substrate 301.

In another alternative embodiment, the surface treatment 1006 is applied with or without lithography to the substrate before it is metalized. A metal layer is then deposited onto the substrate with or without any patterning. The carbon film 501 is then lastly deposited.

Figure 16:
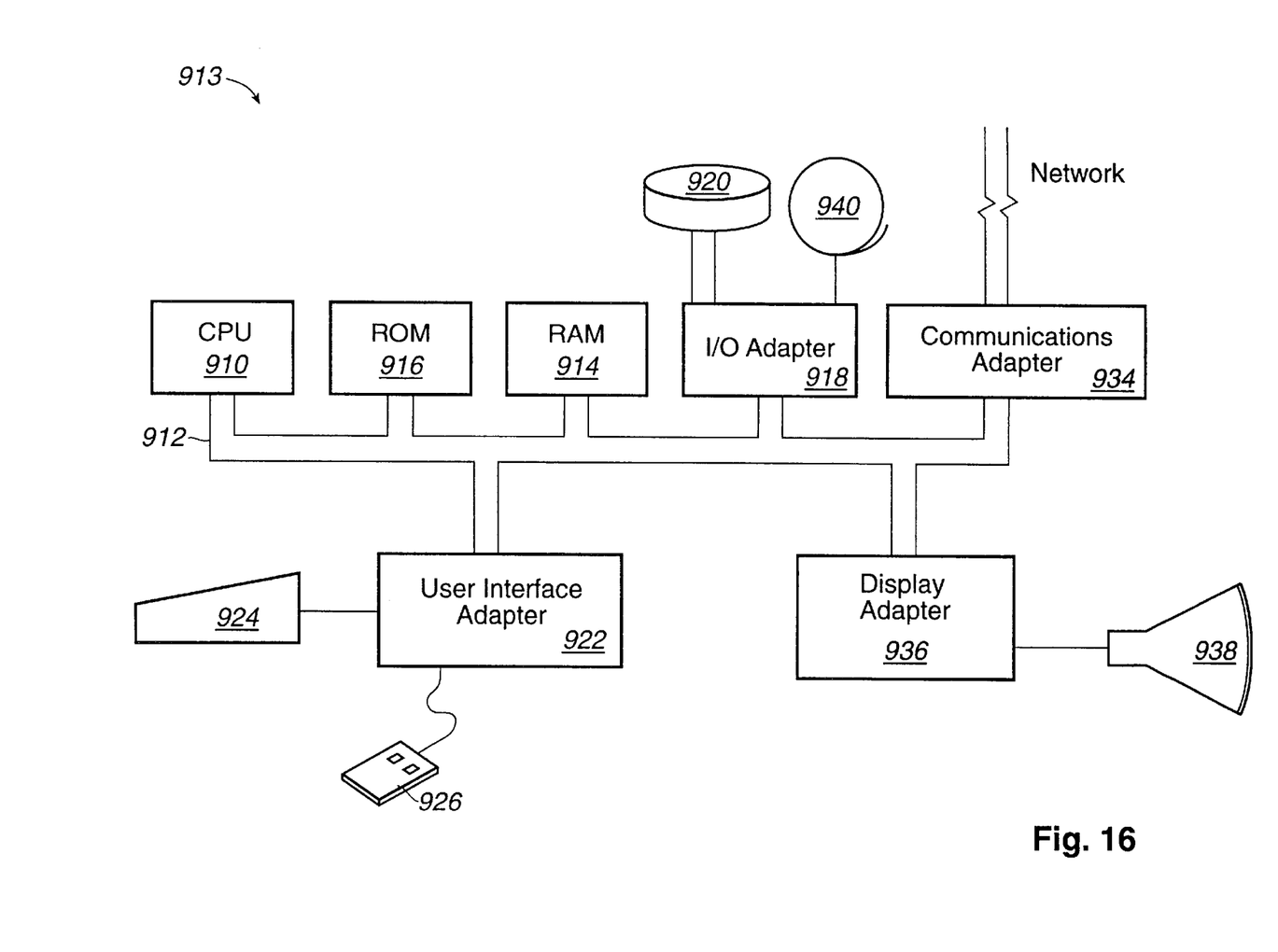
FIG. 16 illustrates a data processing system utilizing a display device manufactured with a field emitter in accordance with the present invention.
Figure 17:
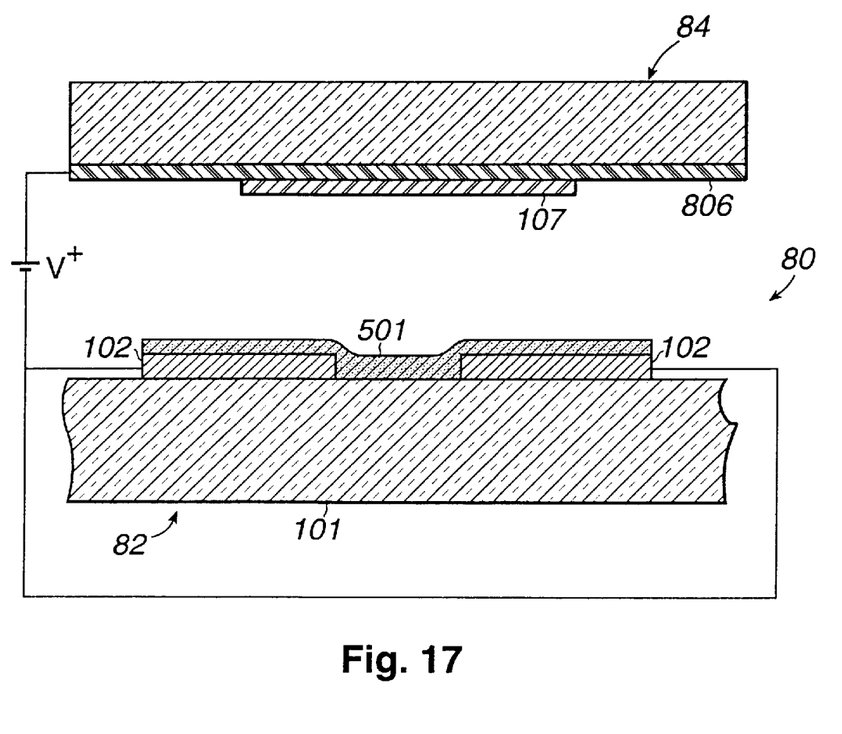
FIG. 17 illustrates a field emission device manufactured with a film in accordance with the present invention.

Referring next to FIG. 17, there is illustrated field emitter device 80 configured with a film produced of the processes illustrated in FIG. 10. Device 80 could be utilized as a pixel within a display device, such as within display 938 described below with respect to FIG. 16.

Device 80 also includes anode 84, which may comprise any well-known structure. Illustrated is anode 84 having a substrate 805, with a conductive strip 806 deposited thereon. Then, phosphor layer 807 is placed upon conductive film 806. An electrical potential V+ is applied between anode 84 and cathode 82 as shown to produce an electric field, which will cause electrons to emit from film 501 towards phosphor layer 807, which will result in the production of photons through glass substrate 805. Note that an alternative embodiment might include a conductive layer deposited between film 501 and substrate 101. A further alternative embodiment may include one or more gate electrodes (not shown).

The gap between anode 84 and cathode 82 may be 0.75 millimeters (750 microns).

Figure 11:
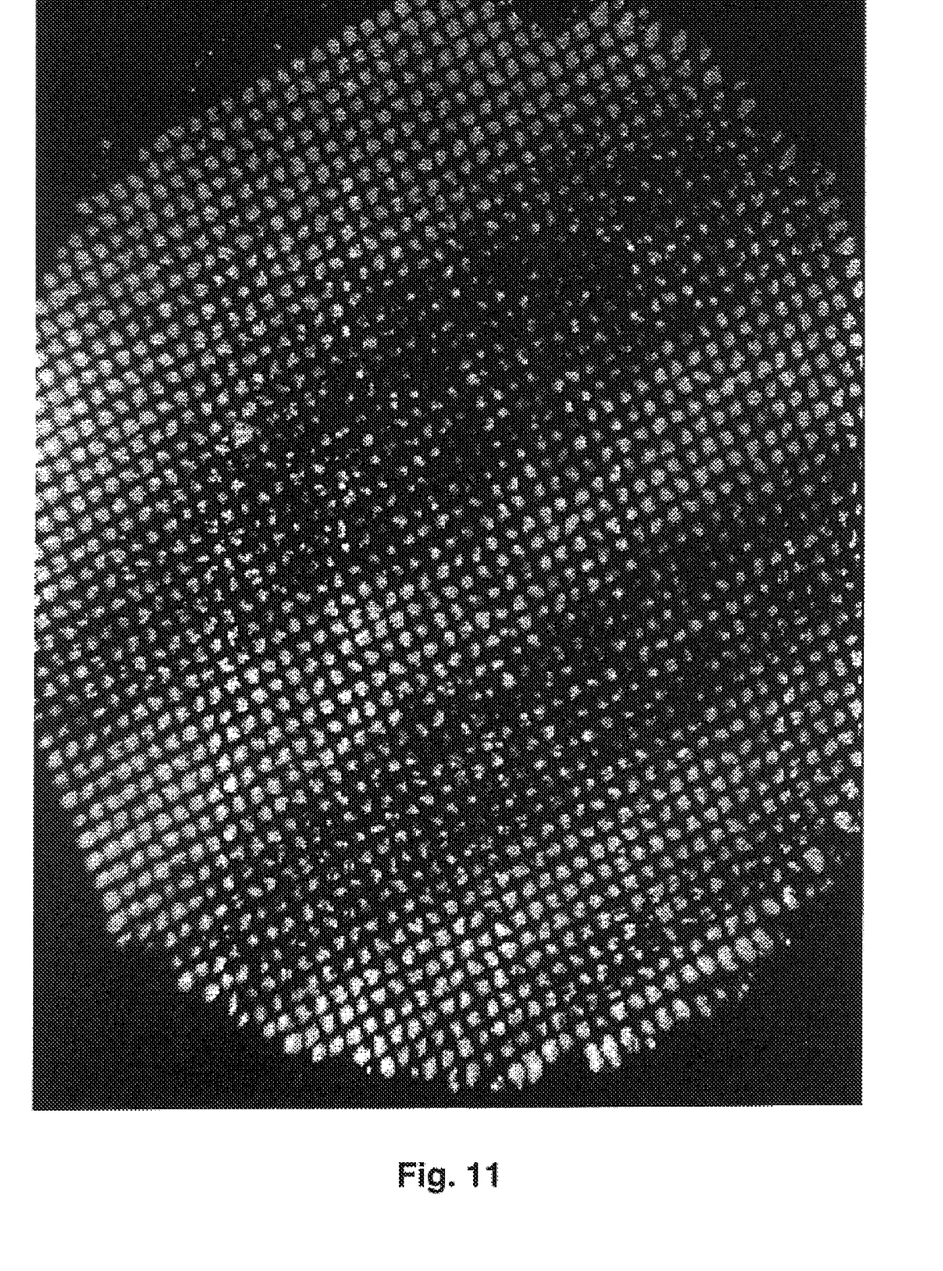
FIGS. 11–14 illustrate images of emission from a cathode manufactured in accordance with the present invention.
Figure 12:
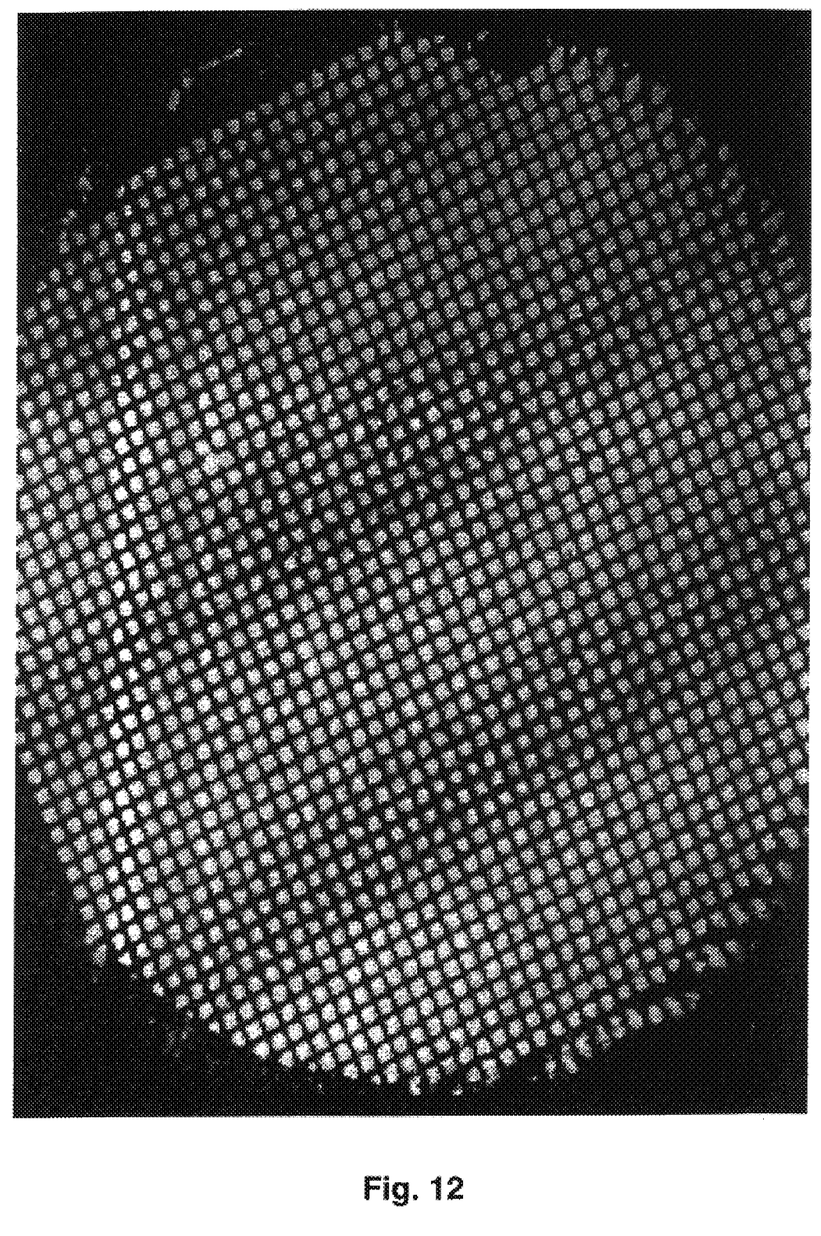
Figure 13:
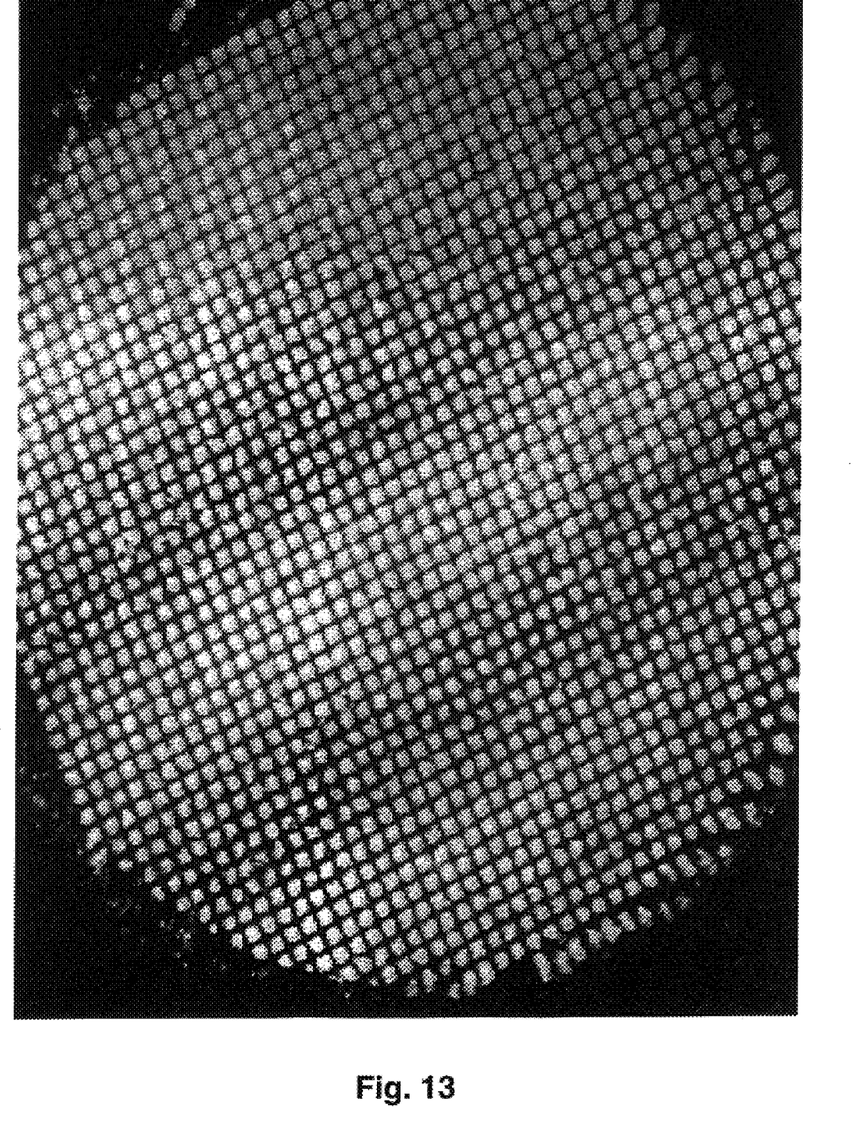

Referring next to FIGS. 11–13, there are shown actual images of photon emission from device 80 taken with different applied voltages, and hence, different applied fields between the anode 84 and the cathode 82. The images in FIGS. 11–13 were taken by applying a pulsed voltage at 1000 Hz frequency with a 10 microsecond pulse width. The gap between anode and cathode was 0.75 mm. In FIG. 11, the peak emission current was 4 mA with an applied voltage of 3230 volts. In FIG. 12, the peak emission current was 40 mA with an applied voltage of 4990 volts. In FIG. 13, the peak emission current was 20 mA with an applied voltage of 3720 volts. As can be readily seen, light is generated in the phosphor screen 84 only in the areas where electrons from the cathode 82 strike the phosphor 807. It is seen in FIGS. 11–13 that the area of the substrate 101 that was subjected to the treatment process is the area from where electron emission occurs.

Figure 14:
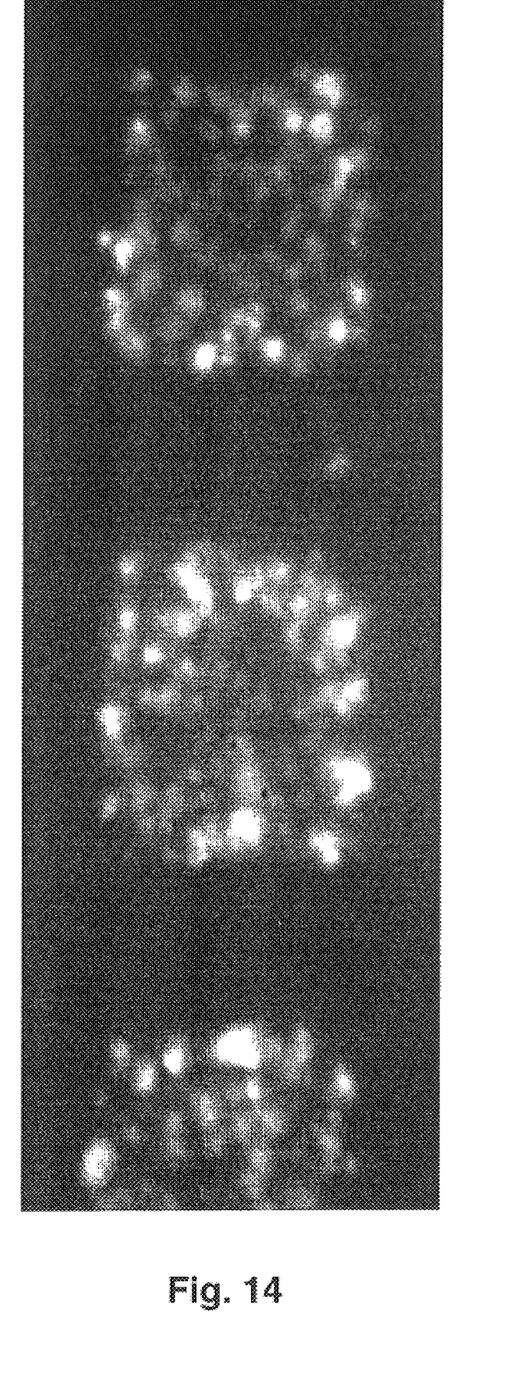

FIG. 14 shows a similar actual image from a similar test except that the gap between the anode 84 and cathode 82 is much smaller (43 microns) and the camera set-up to take this image provided a higher resolution image. Again, one can see from the lighted areas of the phosphor that the area on the cathode 82 that was subjected to the treatment process is the area from where almost all the electron emission occurs.

Figure 15A:
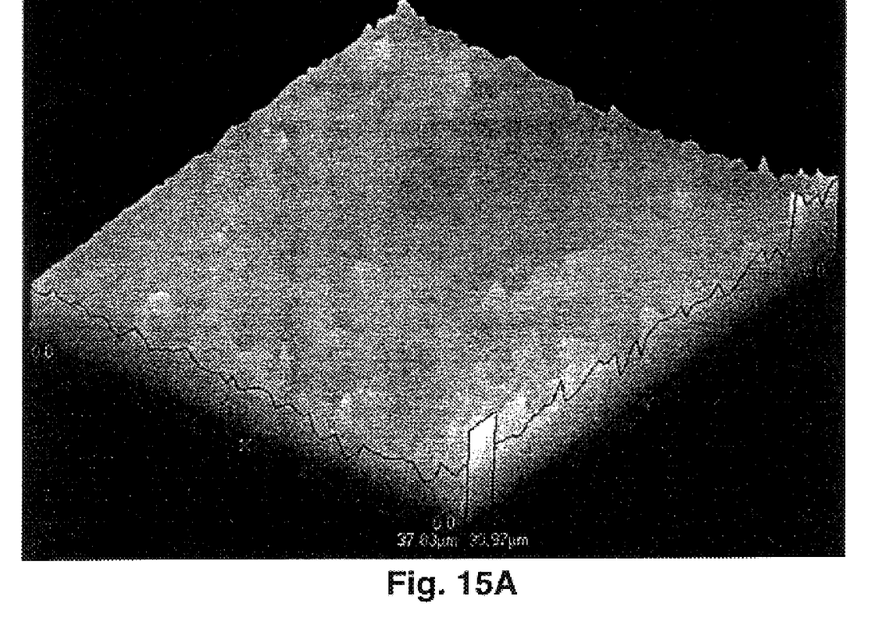
FIGS. 15A and 15B illustrate the difference in a substrate surface due to the treating step 1006 in FIG. 10.
Figure 15B:
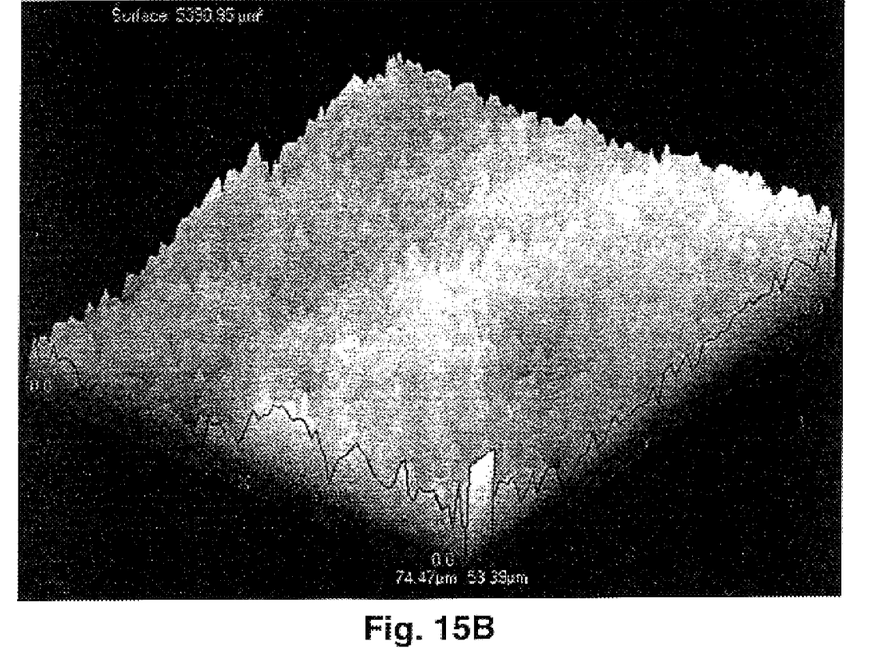

FIG. 15A shows a digital photograph of a Confocal laser scanning microscopic image of a substrate before it has been treated in step 1006. FIG. 15B shows the same substrate after surface treatment in step 1006. It is quite clear that the surface treatment enhanced the surface roughness of the substrate, which in this instance changed from 0.27 to 0.39 micrometers.

As noted above, field emitter device 80 may be utilized within field emission display 938 illustrated in FIG. 16. A representative hardware environment for practicing the present invention is depicted in FIG. 16, which illustrates a typical hardware configuration of workstation 913 in accordance with the subject invention having central processing unit (CPU) 910, such as a conventional microprocessor, and a number of other units interconnected via system bus 912. Workstation 913 includes random access memory (RAM) 914, read only memory (ROM) 916, and input/output (I/O) adapter 918 for connecting peripheral devices such as disk units 920 and tape drives 940 to bus 912, user interface adapter 922 for connecting keyboard 924, mouse 926, speaker 928, microphone 932, and/or other user interface devices such as a touch screen device (not shown) to bus 912, communication adapter 934 for connecting workstation 913 to a data processing network, and display adapter 936 for connecting bus 912 to display device 938. CPU 910 may include other circuitry not shown herein, which will include circuitry commonly found within a microprocessor, e.g., execution unit, bus interface unit, arithmetic logic unit, etc. CPU 910 may also reside on a single integrated circuit.

Although the present invention and its advantages have been described in detail, it should be understood that various changes, substitutions and alterations can be made herein without departing from the spirit and scope of the invention as defined by the appended claims.

What is claimed is:

1. A method for making a field emitter device comprising the steps of:

providing a substrate;

treating said substrate to modify a morphology of said substrate;

growing a carbon film on said treated substrate;

depositing a metal layer on said substrate before said treating step;

patterning said metal layer before said treating step;

etching said patterned metal layer to expose portions of the substrate, wherein the treating step is then performed; and depositing a second film on the treated substrate, wherein the carbon film is grown on said second metal film.

* * * * *